United States Patent
Pan et al.

(10) Patent No.: US 11,159,465 B2
(45) Date of Patent: *Oct. 26, 2021

(54) SERVICE APPARATUS AND METHOD FOR PROVIDING DEFERRED MESSAGE, AND STORAGE MEDIUM

(71) Applicant: TENCENT TECHNOLOGY (SHENZHEN) COMPANY LIMITED, Shenzhen (CN)

(72) Inventors: Lin Pan, Shenzhen (CN); Jianguo Dang, Shenzhen (CN); Yasheng Zhang, Shenzhen (CN); Tongxing Ma, Shenzhen (CN); Kailiang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 3 days.

This patent is subject to a terminal disclaimer.

(21) Appl. No.: 16/459,147

(22) Filed: Jul. 1, 2019

(65) Prior Publication Data

US 2019/0327196 A1    Oct. 24, 2019

Related U.S. Application Data

(63) Continuation of application No. 14/569,273, filed on Dec. 12, 2014, now Pat. No. 10,389,665, which is a
(Continued)

(30) Foreign Application Priority Data

Jun. 27, 2012 (CN) .......................... 201210214739.3

(51) Int. Cl.
*H04L 12/58* (2006.01)
*G06F 16/24* (2019.01)

(52) U.S. Cl.
CPC .............. *H04L 51/14* (2013.01); *G06F 16/24* (2019.01); *H04L 51/043* (2013.01)

(58) Field of Classification Search
CPC .. H04L 51/14; H04L 51/043; G06F 17/30386
(Continued)

(56) References Cited

U.S. PATENT DOCUMENTS

2004/0039786 A1    2/2004  Horvitz et al.
2006/0080130 A1*   4/2006  Choksi ................... G06Q 99/00
                                                               705/1.1
(Continued)

FOREIGN PATENT DOCUMENTS

CN    1482787    3/2004
CN    1794723    6/2006
(Continued)

OTHER PUBLICATIONS

National Searching Authority, The State Intellectual Property Office, Search Report for CN201210214739.3, Search Report Results (with English Translation), dated Jun. 17, 2014.
(Continued)

*Primary Examiner* — David R Lazaro
*Assistant Examiner* — Zia Khurshid
(74) *Attorney, Agent, or Firm* — Oblon, McClelland, Maier & Neustadt, L.L.P.

(57) ABSTRACT

A service apparatus and method for providing a deferred message, and a storage medium. The service method for providing a deferred message comprises: receiving a message parameter sent by a first client and to be forwarded to a second client (S1); determining whether a user associated with the second client is online (S2); if the user associated with the second client is not online, determining that the message parameter to be forwarded is a message parameter of a deferred message, and saving the message parameter
(Continued)

into a database of a server (S3); and when receiving an online prompt of the user associated with the second client, delivering the message parameter to the second client (S4). The method can significantly reduce the network traffic and occupation of the storage space.

20 Claims, 5 Drawing Sheets

Related U.S. Application Data continuation of application No. PCT/CN2013/077912, filed on Jun. 25, 2013.

(58) Field of Classification Search
USPC .......................................................... 709/206
See application file for complete search history.

(56) References Cited

U.S. PATENT DOCUMENTS

| | | | |
|---|---|---|---|
| 2007/0070988 A1 | 3/2007 | Mu | |
| 2007/0203995 A1* | 8/2007 | Wang | H04L 51/04 709/206 |
| 2008/0065974 A1* | 3/2008 | Campbell | G06Q 10/107 715/200 |
| 2008/0155031 A1 | 6/2008 | Fortier et al. | |
| 2009/0198761 A1 | 8/2009 | Nanda et al. | |
| 2010/0205539 A1 | 8/2010 | Gestsson et al. | |

FOREIGN PATENT DOCUMENTS

| | | |
|---|---|---|
| CN | 1859622 | 11/2006 |
| CN | 101193070 | 6/2008 |
| CN | 102307210 | 1/2012 |
| JP | 2002268997 | 9/2002 |
| JP | 2005227851 | 8/2005 |
| JP | 2009002066 | 12/2008 |
| JP | 2009026327 | 2/2009 |
| JP | 2015050112 | 3/2015 |
| JP | 2015190269 | 11/2015 |

OTHER PUBLICATIONS

National Searching Authority, The State Intellectual Property Office, First Office Action for CN201210214739.3 (with concise English Translation), dated Jun. 30, 2014.

European Patent Office, Extended Search Report for EP Application No. 13809394.3, dated Jan. 5, 2016.

Japanese Patent Office, First Office Action for Japanese Application No. 2015-518810 (with concise English Translation), dated Nov. 17, 2015.

International Search Authority, The State Intellectual Property Office, Form PCT/ISA/210 for IA Application No. PCT/CN2013/077912, International Search Report (English Translation), dated Sep. 26, 2013.

* cited by examiner

SERVICE APPARATUS AND METHOD FOR PROVIDING DEFERRED MESSAGE, AND STORAGE MEDIUM

CROSS-REFERENCE TO RELATED APPLICATIONS

This application is a continuation of U.S. Ser. No. 14/569,273 filed Dec. 12, 2014, which is a continuation application of PCT Application PCT/CN2013/077912 filed on Jun. 25, 2013, which claims benefit of priority to Chinese patent application No. 201210214739.3 filed on Jun. 27, 2012. The aforementioned patent applications are hereby incorporated by reference in their entirety for all purposes.

TECHNICAL FIELD

The present disclosure relates to computer technology, and in particular to a service apparatus and method for providing deferred message, and a storage medium.

BACKGROUND

Email is a network application emerging in earlier days, and email users can transmit data and information in a non-real-time manner with email addresses provided by a server. With email, users can achieve a non-real-time communication which, however, cannot meet a user's requirement for real time property. Instant messaging tools have appeared now for developing Instant messaging (IM) transactions to transmit data and information between users in real time.

With the development of network technology, instant messaging has been accepted by most of cyber-citizens and become an indispensable part of work and life for people, and IM tools have also been indispensable tools for people in daily work and life. IM tools are widely used in network for daily communications by transmitting text messages or transmitting data files, voice messages, etc. in real time. With the wide use of IM tools, higher demands have been made on their usability. Instant messaging is a manner of real time communication and requires users online for efficient communications. While a user is in an offline status, other users can only send deferred messages to that user.

Deferred message service is such a service that enables deferred messages to be sent to a selected user so that the user can see the messages when he/she was not online. Deferred message may be one sent by a message poster to the selected user, e.g. from user A to user B, or one sent to a selected user group, e.g. to a plurality of users that participated in an activity, or one sent to the users that have a common property, e.g. to all the VIP users.

FIG. 1 shows a prior art service system for providing deferred message. As shown in FIG. 1, the prior art service system 10 for providing deferred message includes a first client 11 used by a message poster, a second client 12 used by a target user, a server 13 and a database 14 in the server 13. The first client 11 and the second client 12 serve as a front end, and the server 13 serves as a back end.

The prior art service system 10 provides deferred message in the following operation flow. The first client 11 posts a message to the server 13. The server 13 checks whether the target user associated with the second client 12 is online; if so, the message is directly delivered to the second client 12, otherwise the message is stored in the database 14 in the server 13 as a deferred message. Then when the target user associated with the second client 12 becomes online, the server 13 obtains a notification. The server 13 checks whether there is a deferred message for the second client 12, and if so, the deferred message stored in the database 14 is delivered to the second client 12 and is deleted; in other words, the deferred message is no longer stored in the database 14 in the server 13, but stored locally in the second client 12.

In the prior art service system 10 for providing deferred message, if a large amount of deferred messages are received during the offline of the target user associated with the second client 12, a mass volume of storage space has to be used for storing these deferred messages in the database 14 in the server 13, resulting in a large consumption of storage space of the database 14. In order to avoid excessive occupation of the storage space of the database 14, a conventional approach is to keep only the deferred messages of a certain amount and in a certain period. The amount and period set for keeping deferred messages has a direct influence on the scale of the storage medium for the database 14.

Moreover, after a deferred message is delivered to the second client 12, the delivered deferred message is no longer kept in the database 14 in the server 13, but retained locally in the second client 12. The user thus can only review a history record of messages locally but not review the history record of messages on any computer. In other words, the prior art service system 10 for providing deferred message does not support roaming of history record of messages.

In addition, the prior art service system 10 for providing deferred message involves a huge amount of network traffic. When a large amount of users are online simultaneously or a large amount of users are logging-in, the huge amount of network traffic will lead to a high requirement on the outward bandwidth of the server.

SUMMARY

The disclosure provides a service apparatus and method for providing deferred message, and a storage medium to greatly decrease the network traffic and the occupation of the storage space, and to enable roaming of history record of messages.

The present disclosure solves its technical problems with the following technical solutions.

In an aspect, a service apparatus for providing deferred message is provided, including: a receiving module configured to receive a message parameter sent by a first client and to be forwarded to a second client; a determining module configured to determine whether a user associated with the second client is online; a storage module configured to determine that the message parameter to be forwarded is a message parameter of a deferred message if the user associated with the second client is not online, and to store the message parameter into a database of a server; and a delivering module configured to deliver the message parameter to the second client when receiving an online prompt of the user associated with the second client.

In another aspect, a service method for providing deferred message is provided, including: receiving a message parameter sent by a first client and to be forwarded to a second client; determining whether a user associated with the second client is online; determining that the message parameter to be forwarded is a message parameter of a deferred message if the user associated with the second client is not online, and storing the message parameter into a database of a server; and delivering the message parameter to the second client when receiving an online prompt of the user associated with the second client.

In yet another aspect, a storage medium is provided including computer-executable instructions for implementing a service method for providing deferred message, the service method for providing deferred message including: receiving a message parameter sent by a first client and to be forwarded to a second client; determining whether a user associated with the second client is online; determining that the message parameter to be forwarded is a message parameter of a deferred message if the user associated with the second client is not online, and storing the message parameter into a database of a server; and delivering the message parameter to the second client when receiving an online prompt of the user associated with the second client.

The service apparatus and method for providing deferred message, and the storage medium provided by the present disclosure may bring various advantages.

Network traffic may be greatly reduced. Since type and content for a non-real-time communication message may be finite and can be generalized, in the present disclosure the message template and the message parameter are separated and the message template is downloaded in advance, thereby the common portion (i.e. the message template) among deferred messages is not downloaded repeatedly and the network traffic is reduced. The yield of service under a limited outward bandwidth is thus increased and the usage of resources is improved.

With the service apparatus and method for providing deferred message, and the storage medium provided by the present disclosure, storage space occupied on the database in the server can be greatly reduced. Since message template is applied, only a few message parameters need to be stored and thus the consumption of storage space in the server can be reduced. It is to be noted that most of the messages of non-real-time communications are group messages covering known user groups, and in the present disclosure group messages are stored collectively in a specialized group message storage, the storage space can be further reduced and prompt responses can be made.

Moreover, the service apparatus and method for providing deferred message, and the storage medium provided by the present disclosure can be configured such that after a deferred message is delivered to the second client, the deferred message stored in the database in the server is not deleted. As a message parameter occupy only a relatively small storage space, this will not excessively increase the burden on the server; as the message parameters can be retained in the server, roaming of history record of messages can be supported whereby a user can view the message history on any computer.

The disclosure as generally described above will be detailed in terms of embodiments with reference to the drawings in the following so that a person skilled in the art will appreciate and be enabled to implement the technical solutions.

DETAILED DESCRIPTION OF THE EMBODIMENTS

In order to make clear the technical approaches that the disclosure takes for achieving one or more goals and its effects, the service apparatus and method for providing deferred message as proposed in the disclosure will be detailed below with reference to the drawings in terms of specific embodiments, methods, steps, structures, features and effects.

The forgoing and other technical content, features and effect of the disclosure will be clearly presented in the detailed description of the embodiments below with reference to the drawings. The drawings however are illustrative instead of limiting.

Figure 1:
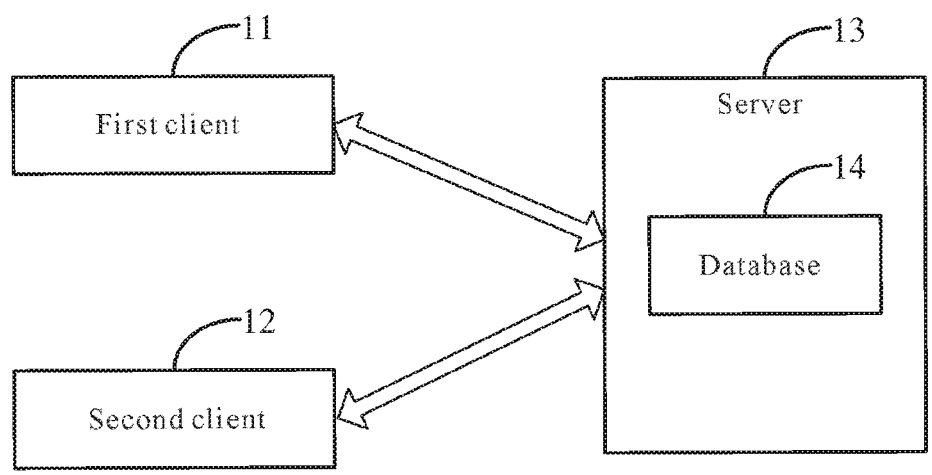
FIG. 1 shows a prior art service system for providing deferred message.
Figure 2:
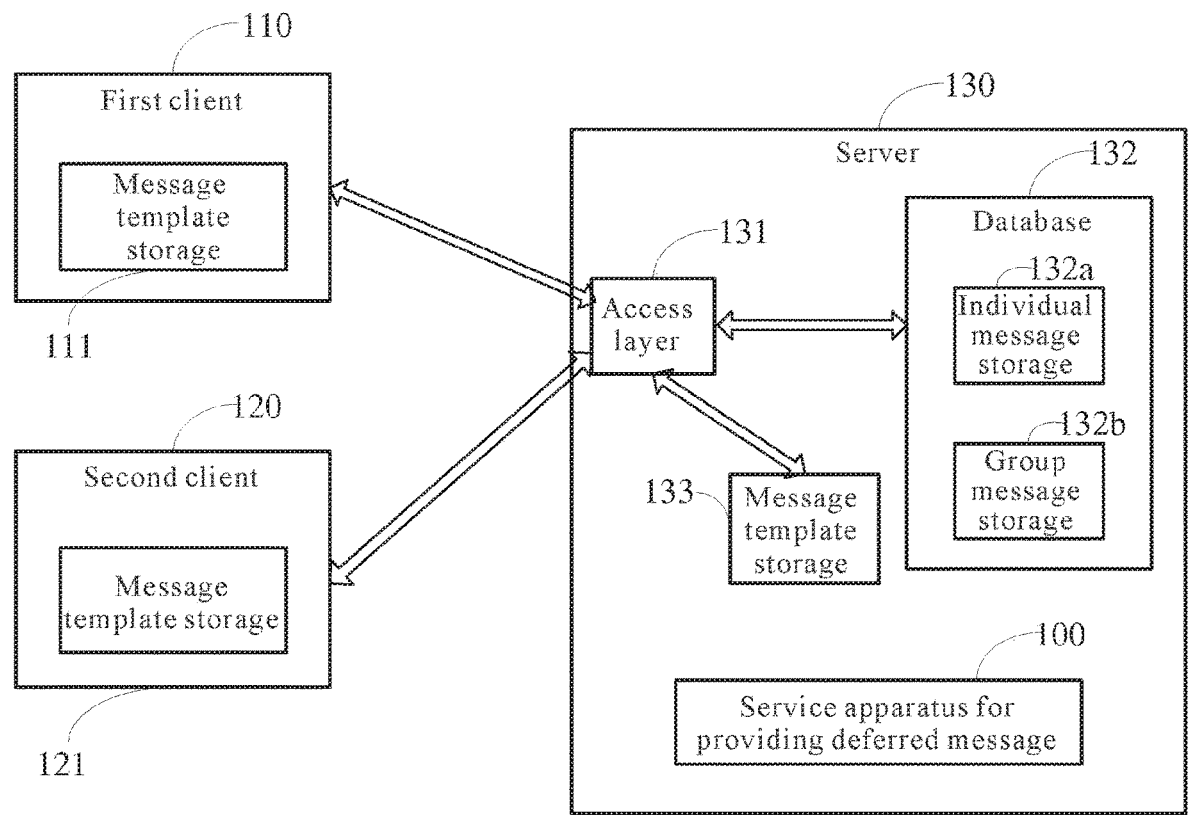
FIG. 2 illustrates an environment in which a service apparatus for providing deferred message according to an embodiment of the disclosure can be applied.

FIG. 2 illustrates an environment in which a service apparatus 100 for providing deferred message according to an embodiment of the disclosure can be applied. The service apparatus 100 for providing deferred message is applied in a server 130 including an access layer 131, a database 132 and a message template storage 133. The access layer 131 is configured to enable communications between the server 130 and clients, e.g. a first client 110 and a second client 120. A user associated with the first client 110 is a message poster, and a user associated with the second client 120 is a target user. In the embodiment, the first client 110 and the second client 120 each have a local message template storage 111 and 121.

Figure 3:
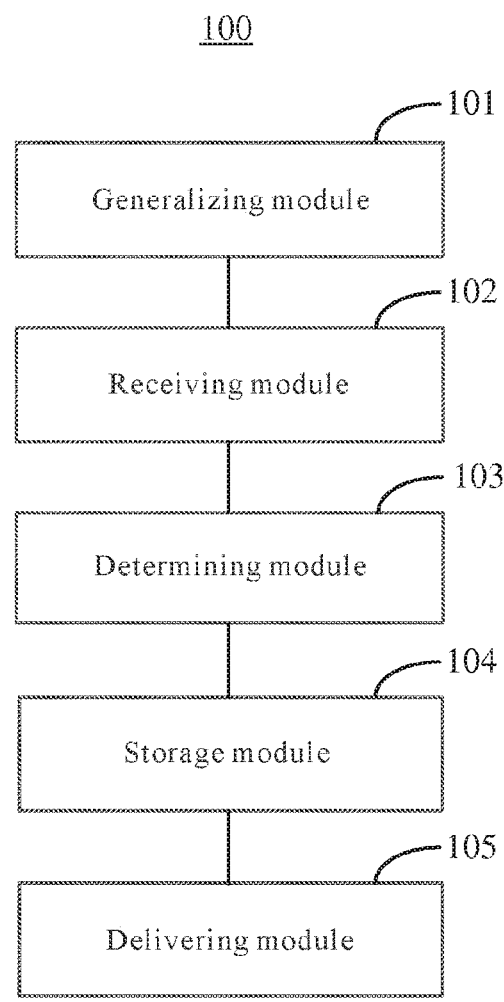
FIG. 3 illustrates a block diagram of the service apparatus for providing deferred message according to the embodiment of the disclosure.

Reference is made to FIG. 3 which illustrates a block diagram of the service apparatus 100 for providing deferred message according to the embodiment of the disclosure. The service apparatus 100 for providing deferred message includes a generalizing module 101, a receiving module 102, a determining module 103, a storage module 104 and a delivering module 105. It is to be noted that the respective modules may be computer program or program segments for implementing one or more specific functions, and the dividing of the modules above does not mean that the practical program codes are necessarily separated.

The generalizing module 101 is configured to classify deferred messages of a type in advance to extract a portion, which is common to the deferred messages in both formality and content, as a message template. The message template may be stored in the local message template storage 111 of the first client 110, the local message template storage 112 of the second client 120, and the message template storage 133 of the server 130. The message template includes mainly a format template and a content template.

In the present disclosure, the message template is stored in the local message template storage 111 of the first client 110, the local message template storage 112 of the second client 120 and the message template storage 133 of the server 130 in advance, the first client 110, when sending a deferred message, can simply post the message parameters of the deferred message to the database 132 in the server 130; the server 130, when delivering the deferred message, can simply deliver to the second client 120 the message parameters of the deferred message stored in the database 132. When presenting the deferred message, the second client 120 can simply retrieve the corresponding message template from its local message template storage 121 and post the message parameters to the retrieved message template, and the deferred message can thus be presented to the user associated with the second client 120.

For example, when the first client 110 intends to send to the second client 120 a message of adding a user, the message is a deferred message if the user associated with the second client 120 is not online. When sending the deferred message of adding a user, the first client 110 may simply send the message parameters of this deferred message, e.g. the name of the user that is performing the adding and the name of the user to be added, to the server 130. The server 130 needs only to store the received message parameters to the database 132, and then delivers the message parameters stored in the database 132 (e.g. the name of the user that is performing the adding and the name of the user to be added) to the second client 120 when the user associated with the second client 120 becomes online.

Moreover, in the present disclosure, the deferred message may include an individual message and a group message, and the message parameter may include an individual message parameter and a group message parameter. Correspondingly, the database 132 in the server 130 may include an individual message storage 132*a* and a group message storage 132*b*. The individual message storage 132*a* is configured to store the individual message parameter of an individual message for separate particular target users, and the group message storage 132*b* is configured to store the group message parameter of a group message that covers a plurality of target users of a particular group. In other words, in the present disclosure, a message, by which the people to be covered and of which the content is known, is a group message and collectively stored in the specialized group message storage 132*b*. Target users of a group message may include two types: one being a plurality of users having a common property, e.g. having an identity of player (e.g. VIP users, or users of Photo Show service, or all users of a certain game, etc.), and another being a plurality of users not having a common property, but having specific numbers, e.g. a plurality of users randomly selected. A group message has message content and properties as specialized configuration file for being managed in a configuration and management center. A group message has a user status, e.g. already read by the user or not yet read by the user, which is stored separately from the individual message; e.g. it may be stored in the group message storage 132*b* which is in a rank faster than that of the individual message storage 132*a*.

The receiving module 102 is configured to receive the message parameter sent by the first client 110 and to be forwarded to the second client 120.

The determining module 103 is configured to determine whether the user associated with the second client 120 is online.

The storage module 104 is configured to determine that the message parameter to be forwarded is a message parameter of a deferred message if the user associated with the second client 120 is not online, and to store the message parameter into the database 132 of the server 130.

The delivering module 105 is configured to deliver the message parameter to the second client 120 when receiving an online prompt of the user associated with the second client 120.

In an embodiment, the delivering module 105 is further configured to check, when receiving the online prompt of the user associated with the second client 120, whether the message template stored in the local message template storage 121 of the second client 120 needs to be updated. If the message template stored in the local message template storage 121 of the second client 120 needs to be updated, the message template stored in the local message template storage 121 of the second client 120 is updated based on the message template in the message template storage 133 of the server 130.

A person skilled in the art will appreciate that in the present disclosure, when the user associated with the second client 120 becomes online, the message template stored in the local message template storage 121 of the second client 120 may be updated. It is possible to both update the message template that has been stored in the local message template storage 121 and download a new message template from the message template storage 133 in the server 130. Alternatively, it is also possible to configure such that only the message template that has been stored in the local message template storage 121 is updated. Before presenting the deferred message, the second client 120 may determine whether a message template corresponding to the deferred message is stored in the local message template storage 121 of the second client 120, and present, if yes, the deferred message based on the message parameter and the message template, or download, if no, the message template corresponding to the deferred message to the local message template storage 121 of the second client 120 from the message template storage 133 of the server 130 and then present the deferred message based on the message parameter and the message template. In other words, the message template may be pre-downloaded from the message template storage 133 in the server 130 at the time of a certain template being needed, which prevents the local storage space of the second client being excessively occupied.

If the message template stored in the local message template storage 121 of the second client 120 does not need to be updated or has been updated, the delivering module 105 may deliver the message parameter to the second client 120 so that the second client 120 presents the deferred message based on the message parameter and the message template stored in the local message template storage 121. After the delivering module delivers the message parameter to the second client 120, a status of the deferred message may be modified so that the deferred message becomes a delivered message.

Figure 4:
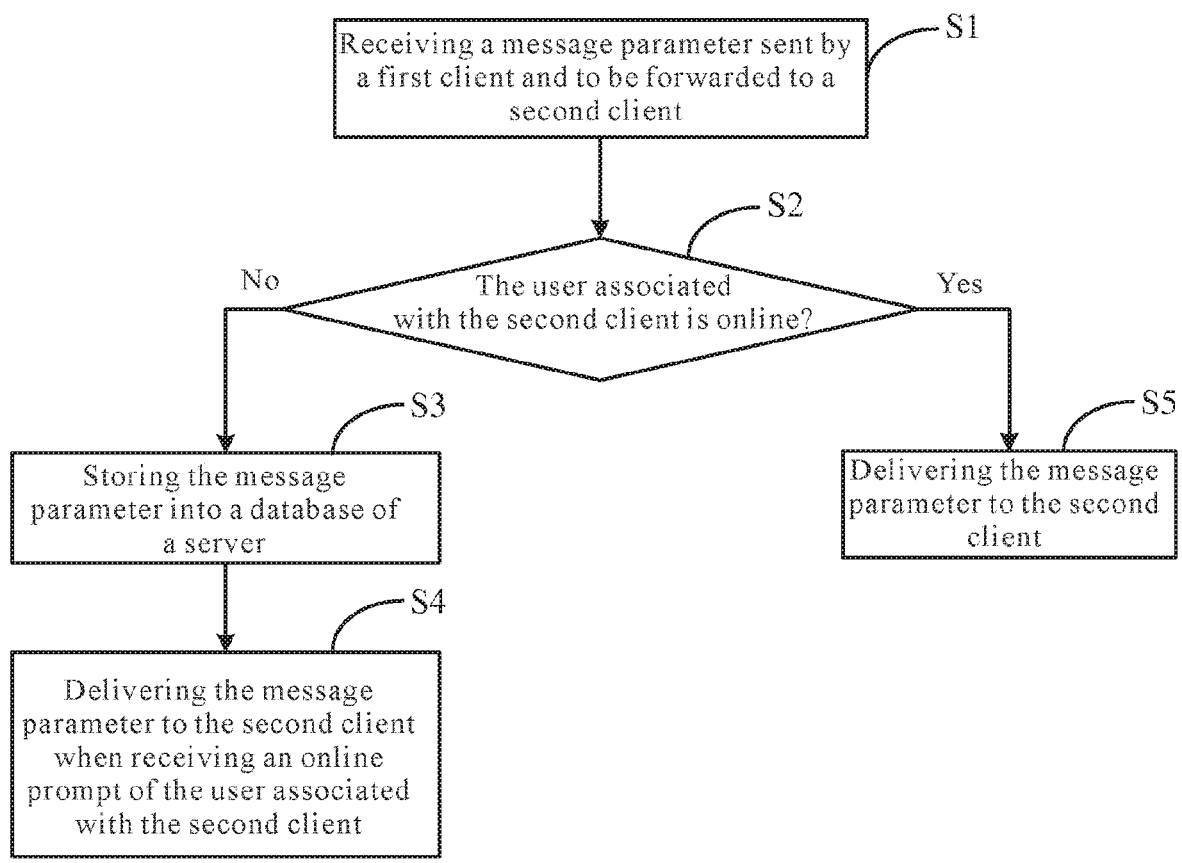
FIG. 4 illustrates a flowchart of a service method for providing deferred message according to an embodiment of the disclosure.

With reference to FIG. 4, a service method for providing deferred message is provided according to an embodiment of the disclosure. Before the following step S1 is performed, deferred messages of a type may be classified in advance to extract a portion, which is common to the deferred messages in both formality and content, as a message template, and the message template may be stored in the message template storage 133 of the server 130 and a local message template storage of a client (e.g. the local message template storage 111 of the first client 111 and the local message template storage 121 of the second client 120) shown in FIG. 2.

In step S1, a message parameter sent by the first client 110 and to be forwarded to the second client 120 is received.

In step S2, it is determined whether a user associated with the second client 120 is online. If the user associated with the second client 120 is not online, then it is determined that the message to be forwarded is a deferred message, and step S3 is executed. If the user associated with the second client 120 is online, then step S5 is executed.

In step S3, the message parameter of the deferred message is stored into the database 132 of the server 130.

In step S4, when an online prompt of the user associated with the second client 120 is received, the message parameter is delivered to the second client 120.

In step S5, the message parameter is delivered to the second client 120.

Figure 5:
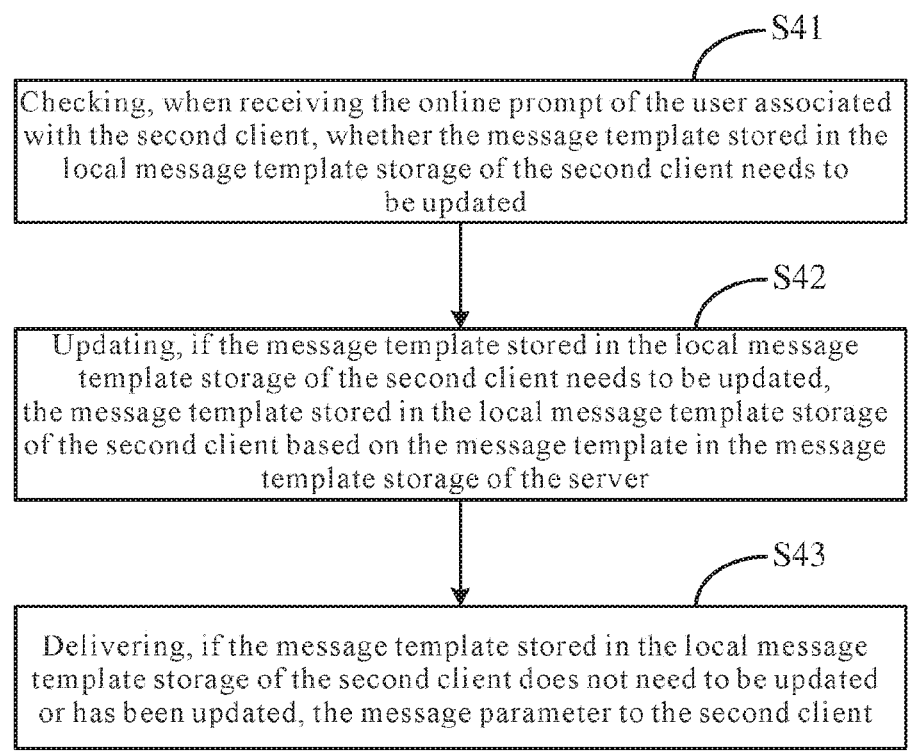
FIG. 5 illustrates a flowchart for delivering a message parameter to a second client.

FIG. 5 illustrates a flowchart for delivering the message parameter to the second client 120. As shown in FIG. 5, the step of delivering the message parameters to the second client 120 may further comprise:

step S41 of checking whether the message template stored in the local message template storage 121 of the second client 120 needs to be updated;

step S42 of updating, if the message template stored in the local message template storage 121 of the second client 120 needs to be updated, the message template stored in the local message template storage 121 of the second client 120 based on the message template in the message template storage 133 of the server 130; and step S43 of delivering, if the message template stored in the local message template storage 121 of the second client 120 does not need to be updated or has been updated, the message parameter to the second client 120 so that the second client 120 presents the deferred message based on the message parameter and the message template stored in the local message template storage 121. Step S33 may further include modifying a status of the deferred message.

With the service apparatus and method for providing deferred message according to the disclosure, network traffic may be greatly reduced. Since type and content for a non-real-time communication message (i.e. deferred message) may be finite and can be generalized, in the present disclosure the message template and the message parameter are separated and the message template is downloaded in advance, thereby the common portion (i.e. the message template) among deferred messages is not downloaded repeatedly and the network traffic is reduced. The yield of service under a limited outward bandwidth is thus increased and the usage of resources is improved.

With the service apparatus and method for providing deferred message according to the present disclosure, storage space occupied on the database 132 in the server 130 can be greatly reduced. Since message template is applied, only a few message parameters need to be stored and thus the consumption of storage space in the server 130 can be reduced. It is to be noted that most of the messages of non-real-time communications are group messages covering known user groups, and in the present disclosure group messages are stored collectively in a specialized group message storage 132b, the storage space can be further reduced and prompt responses can be made.

Moreover, the service apparatus and method for providing deferred message according to the present disclosure can be configured such that after a deferred message is delivered to the second client 120, the deferred message stored in the database 132 in the server 130 is not deleted. As a message parameter occupy only a relatively small storage space, this will not excessively increase the burden on the server 130; as the message parameters can be retained in the server 130, roaming of history record of messages can be supported whereby a user can view the message history on any computer.

A person skilled in the art will appreciate that all or part of the steps for implementing the above embodiments can be performed by hardware, or by programs instructing corresponding hardware. The programs may be stored in a computer readable medium which may be a read-only memory, a magnetic disk or an optical disc, and the like.

The inventive disclosure has been described above in terms of specific embodiments which, however, are not intended to limit the scope of the inventive concept. Those skilled in the art may make various modifications and improvements without departing from the spirit and concept of the invention which is solely defined by the appended claims.

What is claimed is:

1. A method of receiving a deferred instant message from an instant messaging service, the method comprising:
   receiving, by processing circuitry of an information processing apparatus, a message parameter of the deferred instant message from a server when the information processing apparatus is connected to the instant messaging service, the message parameter including text of the deferred instant message; and
   reconstructing, by the processing circuitry, the deferred instant message by inserting the message parameter into content of a message template associated with the deferred instant message, the message template including a common portion that is shared with a plurality of deferred instant messages of a predetermined type that are user generated, wherein
   the message parameter of the deferred instant message received from the server is received by the server from another information processing apparatus, and
   the message template is stored in the information processing apparatus and the other information processing apparatus.

2. The method according to claim 1, further comprising:
   receiving, by the processing circuitry, the message template; and
   storing the message template in a memory of the information processing apparatus.

3. The method according to claim 2, wherein the receiving the message template comprises:
   downloading the message template from the server before the message parameter is received when the message template is not stored in the memory of the information processing apparatus.

4. The method according to claim 1, wherein
   the message parameter includes an individual message parameter and a group message parameter, the individual message parameter being directed to a single user and the group message parameter being directed to a group of users.

5. The method according to claim 1, wherein the template includes a format template and a content template, the format template indicating a display format of the plurality of deferred instant messages of the predetermined type and the content template indicating the common portion.

6. The method according to claim 1, wherein the common portion is a common text portion for the plurality of deferred instant messages of the predetermined type.

7. The method according to claim 1, further comprising:
   receiving an updated version of the message template from the server when a version of the message template stored in a memory is different from the updated version of the message template.

8. The method according to claim 1, wherein the deferred instant message is not deleted from the server after the deferred instant message is received by the information processing apparatus to provide an instant message history that is viewable on a different information processing apparatus.

9. An information processing apparatus, comprising:
   interface circuitry; and
   processing circuitry configured to
      receive, via the interface circuitry, a message parameter of a deferred instant message from a server when the information processing apparatus is connected to an instant messaging service, the message parameter including text of the deferred instant message, and reconstruct the deferred instant message by inserting the message parameter into content of a message template associated with the deferred instant message, the message template including a common portion that is shared with a plurality of deferred instant messages of a predetermined type that are user generated, wherein the message parameter of the deferred instant message received from the server is received by the server from another information processing apparatus, and the message template is stored in the information processing apparatus and the other information processing apparatus.

10. The information processing apparatus according to claim 9, wherein the processing circuitry is configured to
receive the message template; and
store the message template in a memory of the information processing apparatus.

11. The information processing apparatus according to claim 10, wherein the processing circuitry is configured to
download the message template from the server before the message parameter is received when the message template is not stored in the memory of the information processing apparatus.

12. The information processing apparatus according to claim 9, wherein
the message parameter includes one of an individual message parameter and a group message parameter, the individual message parameter being directed to a single user and the group message parameter being directed to a group of users.

13. The information processing apparatus according to claim 9, wherein the message template includes a format template and a content template, the format template indicating a display format of the plurality of deferred instant messages of the predetermined type and the content template indicating the common portion.

14. The information processing apparatus according to claim 9, wherein the common portion is a common text portion for the plurality of deferred instant messages of the predetermined type.

15. The information processing apparatus according to claim 9, wherein the processing circuitry is configured to
receive an updated version of the message template from the server when a version of the message template stored in a memory is different from the updated version of the message template.

16. The information processing apparatus according to claim 9, wherein the deferred instant message is not deleted from the server after the deferred instant message is received by the information processing apparatus to provide an instant message history that is viewable on a different information processing apparatus.

17. A non-transitory computer-readable medium storing instructions which when executed by a processor of an information processing apparatus cause the processor to perform:

receiving a message parameter of a deferred instant message from a server when the information processing apparatus is connected to an instant messaging service, the message parameter including text of the deferred instant message; and reconstructing the deferred instant message by inserting the message parameter into content of a message template associated with the deferred instant message, the message template including a common portion that is shared with a plurality of deferred instant messages of a predetermined type that are user generated, wherein the message parameter of the deferred instant message received from the server is received by the server from another information processing apparatus, and the message template is stored in the information processing apparatus and the other information processing apparatus.

18. The non-transitory computer-readable medium according to claim 17, wherein the message template includes a format template and a content template, the format template indicating a display format of the plurality of deferred instant messages of the predetermined type and the content template indicating the common portion.

19. The non-transitory computer-readable medium according to claim 17, wherein the common portion is a common text portion for the plurality of deferred instant messages of the predetermined type.

20. The non-transitory computer-readable medium according to claim 17, wherein the instructions when executed by the processor further cause the processor to perform:

receiving an updated version of the message template from the server when a version of the message template stored in a memory is different from the updated version of the message template.

* * * * *